United States Patent [19]

Rowen et al.

[11] 4,299,088
[45] Nov. 10, 1981

[54] CYCLIC LOAD DUTY CONTROL FOR GAS TURBINE

[75] Inventors: William I. Rowen, Schenectady; Thomas E. Ekstrom, Scotia; Donald L. Rexford, Schenectady, all of N.Y.

[73] Assignee: General Electric Company, Schenectady, N.Y.

[21] Appl. No.: 88,633

[22] Filed: Oct. 26, 1979

[51] Int. Cl.³ ............................................. F02C 9/48
[52] U.S. Cl. ................................................. 60/39.27
[58] Field of Search .................. 60/39.27, 39.29, 39.25

[56] References Cited

U.S. PATENT DOCUMENTS

| | | | |
|---|---|---|---|
| 3,066,488 | 12/1962 | Mock | 60/39.27 |
| 3,103,785 | 9/1963 | Williams et al. | 60/39.27 |
| 3,255,586 | 6/1966 | Hennig et al. | 60/39.27 |
| 3,520,133 | 7/1970 | Loft et al. | |
| 3,584,459 | 6/1971 | Amann | 60/39.27 |
| 3,639,076 | 2/1972 | Rowen | |
| 3,729,928 | 5/1973 | Rowen | |
| 3,795,104 | 3/1974 | McLean | 60/39.27 |
| 4,197,699 | 4/1980 | Parker et al. | 60/39.25 |

Primary Examiner—Robert E. Garrett
Attorney, Agent, or Firm—Jerome C. Squillaro

[57] ABSTRACT

A gas turbine control for ameliorating the adverse affects of cyclic load applications to both single-shaft and two-shaft gas turbines is disclosed. During cyclic load conditions, air flow is governed to control the output of the gas turbine while fuel flow is controlled to hold the firing or exhaust temperatures substantially constant. Regular fuel flow governing during non-cyclic loading conditions is also provided.

5 Claims, 2 Drawing Figures

C = CYCLIC MODE POSITION
N = NORMAL MODE POSITION

C = CYCLIC MODE POSITION
N = NORMAL MODE POSITION

C = CYCLIC MODE POSITION
N = NORMAL MODE POSITION

CYCLIC LOAD DUTY CONTROL FOR GAS TURBINE

BACKGROUND OF THE INVENTION

1. Field of the Invention

The present invention is related to controls for gas turbines and, more particularly, to an improved control system for a gas turbine power plant which can be adapted for use on either single-shaft or two-shaft machines.

2. Description of the Prior Art

Controlling the various parameters in a large gas turbine has become quite complex, but, as a result of the increasing complexity, the output characteristics have been enhanced together with an increased lifetime for many of the component parts. Such controls normally incorporate means to influence the rate of fuel flow to the gas turbine combustion chamber in accordance with fuel control signals obtained by monitoring the operating parameters of the gas turbine. Examples of such control systems are known in the art and may be found in U.S. Pat. No. 3,520,133 issued July 14, 1970 to A. L. Loft et al for a "Gas Turbine Control System"; U.S. Pat. No. 3,639,076 issued Feb. 1, 1972 to W. I. Rowen for a "Constant Power Control System for a Gas Turbine" and U.S. Pat. No. 3,729,928 issued May 1, 1973 to W. Rowen for a "Torque Control System for a Gas Turbine", all assigned to the assignee of the present invention, and all of which are expressly incorporated herein by reference.

In a single-shaft gas turbine, the method normally utilized to control the output of the machine is to control the amount of fuel delivered to the combustion chamber, which results in changes in the firing temperature. If the firing temperature is changed very rapidly, which can occur in cyclic load applications, thermal stresses are created in the hot gas path parts, such as the turbine blades, since they are not heated evenly in response to rapid changes in gas temperature. Excessive application of thermal stresses can lead to thermal shock which is a condition wherein the thermal stresses that are generated exceed the elastic mechanical strength of the material. Thermal shock, in turn, can lead to component failure requiring expensive shut-down and maintenance.

Thermal shock can, of course, be avoided by minimizing severe or cyclic temperature changes by, for example, changing the load very slowly. However, there are many applications where the output of the gas turbine cannot be controlled, but must respond to external influences. One example is a single-shaft gas turbine connected to an isolated generator powering an arc furnace. Another example is a single-shaft gas turbine connected to an isolated generator for driving a power shovel in a mine. Yet another example is a two-shaft gas turbine for providing propulsion power for an ice-breaking marine vessel. In the latter instance, full power is desired to drive the vessel through the ice until it can go no farther; the propeller is then stopped (the turbine is unloaded) and reversed to remove the ship from the ice to get another running start. It can be appreciated that such a mode of operation results in a cyclic load application to the gas turbine that can result in the above-described thermal fatigue.

It is toward overcoming the problems associated with thermal stresses resulting from cyclic load applications to both single and two-shafts gas trubines that the present invention is advanced.

Known gas turbines employ several different mechanisms for controlling air flow. For example, variable inlet guide vanes can be positioned at the inlet of the compressor for air flow control during start up of the gas turbine to prevent pulsation or surge in the compressor. The guide vanes are utilized to throttle the air to prevent such instabilities until the gas turbine is at full speed. Inlet guide vanes are also utilized to allow maintenance of high exhaust temperatures at part load for heat recovery purposes.

Blow off valves can be positioned in known gas turbines between one stage of the compressor and the gas turbine exhaust and are presently utilized to limit the amount of overspeed in applications where load can be lost instantly.

Another type of air control present in two-shaft gas turbines comprises a variable area turbine nozzle which controls division of energy between the high pressure compressor turbine (and therefore compressor speed) and the low pressure or load turbine for the purpose of optimizing heat rate. The control of the variable area turbine nozzle affects air flow only because it permits variable speed control of the high pressure compressor set.

In known gas turbines utilizing variable inlet guide vanes, blow off valves or variable area nozzles for controlling air flow in and around the compressor, the primary means of controlling turbine output is by varying fuel flow, as described in the above-cited United States Patents.

OBJECTS OF THE INVENTION

It is therefore a primary object of the present invention to reduce abrupt and cyclical changes in temperature in the combustion chamber of a gas turbine in order to minimize the incidence of thermal shock to the hot gas path parts.

Another object of the present invention is to provide an improved control system for a gas turbine which minimizes thermal shock by operating at substantially constant temperature.

Another object of the present invention is to govern air flow in a gas turbine to control gas turbine output while holding essentially constant firing or exhaust temperatures, whichever is most appropriate.

Yet another object of the present invention is to provide a dual-mode gas turbine control system wherein fuel control can be utilized under "normal" loading conditions, while air flow control can be utilized under cyclic load conditions.

SUMMARY OF THE INVENTION

Briefly stated, the adverse effects of thermal fatigue that occur in cyclic loading of gas turbines is significantly lessened by varying the power output of the gas turbine while holding the firing temperature approximately constant. This is accomplished by varying the air flow while holding constant firing temperature. The air flow is controlled utilizing existing air flow control means, such as the variable inlet guide vanes, blow off valves and variable area nozzles, in both single-shaft and two-shaft gas turbines. The gas turbines may be operated in either a "normal" mode where the output is controlled by varying the fuel flow, or in a "cyclic'-'mode where the output is controlled by varying the air flow.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Single-Shaft Turbine Control

Figure 1:
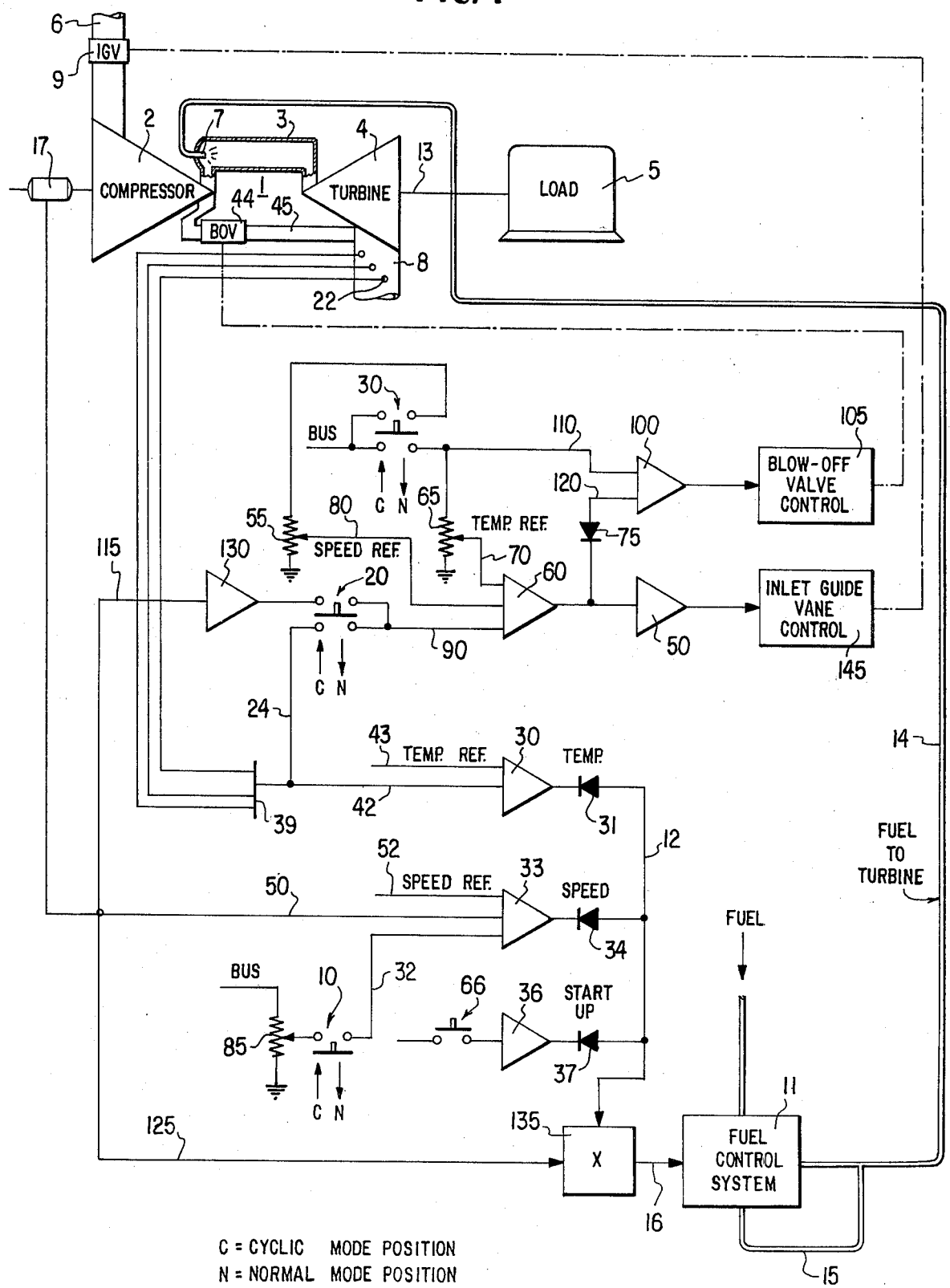
FIG. 1 is a simplified schematic diagram of a control system for a single-shaft gas turbine in accordance with the present invention.

Referring first to FIG. 1, a simplified representation of a single-shaft gas turbine, shown generally as 1, includes a compressor 2, a combustion chamber 3 and a turbine 4 connected to drive a load 5. Air entering the inlet at 6 passes through variable inlet guide vanes 9 to compressor 2 and thence to combustion chamber 3 to support the combustion of fuel injected by nozzle 7. The hot gases produced in combustion chamber 3 drive turbine 4 whose output shaft 13 is connected to drive load 5 and compressor 2. The heated exhaust gases exit from turbine outlet 8 past distributed temperature sensors such as 22 which measure the exhaust temperature. Fuel is delivered to nozzle 7 via conduit 14 from fuel system 11 which comprises a fixed displacement pump that includes a feedback loop 15 for varying the flow to combustion chamber 3 in accordance with an electrical signal representing the desired fuel flow on line 16. Line 16 is the output from a multiplier 135 which receives as one input a fuel demand signal on line 12 and as its other input an electrical signal representing the speed of the turbine on line 125. Speed sensing is provided by, for example, an inductor alternator or magnetic pickup 17 on the rotor shaft 13 of the turbine 1 which provides an electrical signal having a frequency directly proportional to turbine speed.

The fuel control signal on line 12 is a single-valued electrical signal which is applied to multiplier 135 by a low value gate comprised of a plurality of diodes 31, 34 and 37. Diodes 31, 34 and 37 are poled as shown with respect to a common bus 12 from which the fuel control signal is obtained. As is explained in U.S. Pat. No. 3,520,133, this arrangement monitors a series of individual fuel control signals emanating from separate closed loop controls which are responsive to respective operating parameters of the gas turbine 1. The lowest of these fuel control signals is passed on line 12 and subsequently determines the fuel flow to the combustion chamber 3 of the gas turbine.

A plurality of loop control means 30, 33 and 36 are employed, as disclosed in the aforementioned U.S. Pat. No. 3,520,133. In particular, the loop control means include a temperature control 30, a speed and load control 33, and a start-up control 36, each having on their respective output lines the diodes 31, 34 and 37 which comprise a low value gate. Each control signal from control means 30, 33 and 36 is intended to be controlling over a certain phase of gas turbine operation.

Briefly, each control means senses an operating condition of the gas turbine and compares it to a desired reference. For example, the open-loop start-up control 36 produces a programmed fuel control signal on its output in accordance with timed events occuring in the gas turbine, such as a certain speed, detection of flame in the combustion chamber and the like, such events being detected by closure of a plurality of switches indicated schematically by reference numeral 66. The start-up control means 36, along with an acceleration control means (not shown), are not required for the present invention, although they are briefly described for the sake of completeness.

The temperature control means 30 senses the exhaust temperature with the use of the several temperature sensors 22. An average temperature is derived from a temperature averager 39 which is then input on line 42 to the temperature control amplifier 30. An error signal is generated from the output of amplifier 30 when the actual exhaust temperature differs from the temperature reference established by, for example, a potentiometer on line 43.

The speed and load control amplifier 33 derives an actual speed signal from the magnetic pick-up or inductor alternator 17 mounted on turbine shaft 13. The actual speed signal on line 51 is compared with a speed reference on line 52 and the error signal, if any, appears as an output from amplifier 33 as a fuel control signal. The third input 32 to speed and load control amplifier 33 forms a portion of the present invention and will be described in greater detail hereinafter.

Each fuel control signal from amplifiers 30, 33 and 36 is applied to its respective diode 31, 34 and 37. The fuel control signal indicative of the lowest fuel flow to the combustion chamber 3 will appear at the common bus on line 12. It should be noted that, although only one fuel control signal appears on line 12 at any one time, each of the other fuel control signals operate as back-up protection.

The variable inlet guide vanes for gas turbine 1 are positioned just downstream of the compressor inlet 6 and are represented schematically by reference numeral 9. The angular position of inlet guide vanes 9 and hence the amount of air allowed through inlet 6 is controlled by an inlet guide vane control 145 which may comprise a conventional electronic positioner connected to drive the inlet guide vanes 9.

The blow off valves are indicated schematically by reference numeral 44 and are connected in a bypass pipe 45 to permit cycle air to be bypassed from the discharge of compressor 2 to the exhaust 8. Previously, blow off valves 44 were either fully opened or fully closed and were utilized to limit overspeed. However, in accordance with the present invention, the position of blow off valves 44 may be variably controlled by a blow off valve control 105, as will be described in greater detail hereinafter.

The present invention permits the gas turbine 1 to be operated in one of two distinct modes referred to hereinafter as the "normal" mode and the "cyclic" load mode. Switching from one mode to another is under the control of the operator and is effected by means of switches 10, 20 and 30, which are illustrated individually but which are preferably ganged together for simultaneous switching. Reference letter N indicates the position of switches 10, 20, and 30 during the "normal" mode, while reference letter C indicates the position of the switches during the "cyclic" mode when cyclic loading of the turbine is anticipated. This operates to control the power output of the gas turbine by controlling air flow, while holding constant temperature. In the "normal" mode of operation, the power output of the gas turbine is governed by the fuel control signal, and air flow is held constant.

An air flow governing amplifier 60 receives as a reference input either a temperature reference signal on line 70 developed by potentiometer 65, or a speed reference signal on line 80 developed by speed reference potentiometer 55. The temperature reference on line 70 is applied during the "normal" mode, while the speed reference signal on line 80 is applied during the "cyclic" mode, depending upon the position of switch 30. The other input to air flow governing amplifier 60 is a signal on line 90 indicative of either the exhaust temperature on line 24 when switch 20 is in its "normal" position or a speed signal from inverting amplifier 130 and line 115 when switch 20 is in the "cyclic" mode position.

The output of amplifier 60 represents the desired position of inlet guide vanes 9 and blow off valves 44 and is fed to inlet guide vane control 145 and blow off valve control 105 via amplifiers 50 and 100, respectively. Amplifier 50 functions to independently limit the actual inlet guide vane position between minimum and maximum operational positions, such as, for example 48 degrees and 88 degrees, while amplifier 100 operates in response to a signal received on input 110 to clamp the blow off valves closed. A negative signal on line 120 operates to vary the position of the blow off valves between their fully closed and fully opened positions.

In the "normal mode" of operation, when switches 10, 20 and 30 are in their N position, it may be seen that switch 10 has no effect on the speed governing amplifier 33 so that the speed of the gas turbine is being balanced against the speed reference 52 by normal governor action. After start-up has been completed, at part load conditions the output of governor 33 is set to match the speed detected on line 51 with the speed reference on line 52, which is accomplished by controlling the fuel to the turbine. At part load, the start-up amplifier 36 and temperature control amplifier 30 are in saturation since the speed amplifier 33 provides the lowest fuel control signal on line 12. As the speed reference 52 is increased to further load the gas turbine, a point is reached where the exhaust temperature signal on line 42 equals the temperature reference on line 43 whereupon the temperature control amplifier 30 assumes control of the fuel flow to the turbine.

Switch 20 in its N position connects the signal proportional to exhaust temperature on line 42 as the input 90 to air control amplifier 60. The other input to amplifier 60 is on line 70 due to the position of switch 30. Line 70 delivers a voltage to amplifier 60 which is proportional to the desired temperature set on potentiometer 65. The temperature set by temperature reference 65 is somewhat less, for example, 10 degrees, than that set on temperature reference 43. In the "normal" mode, switch 30, in addition to providing a bus voltage to temperature reference potentiometer 65, provides a voltage on line 110 to amplifier 100 which insures that the blow off valves 44 remain closed.

In the "normal" mode, as the machine is loaded up using the speed reference 52, the exhaust temperature tends to rise due to the increasing fuel flow. At part load, as long as the exhaust temperature signal on line 90 is less than the reference temperature signal on line 70, the inlet guide vanes 9 will be held at their full closed position (for example, 48 degrees) by amplifier 50. When the exhaust temperature signal on line 90 equals the inlet guide vane temperature reference signal on line 70, amplifier 60 provides a signal to amplifier 50 to cause the inlet guide vane control 145 to open the inlet guide vanes 9. The air flow to the compressor 2 then increases, and since the fuel flow is independently controlled at this time, the detected exhaust temperature on line 90 will decrease in proportion to the increase in the air flow, which, in turn, brings the signal on line 90 down to the level of the signal on line 70. As the load increase, the fuel flow is raised again, the exhaust temperature rises and the air flow governor 60 acts to open the inlet guide vanes further to bring the temperature down. Air flow governor 60, therefore, during the "normal" mode, acts to position the inlet guide vanes 9 at such an angle that the temperature remains essentially constant according to the temperature reference set on line 70.

When switches 10, 20 and 30 are switched to the "cyclic" mode of operation, which can occur at any load level, switch 10 acts to apply a ramped signal from potentiometer 85 and associated capacitor (not shown) to the speed amplifier 33 which is additive to the speed reference signal on line 52. In addition to causing an increase in fuel, amplifier 33 moves into saturation so that the fuel flow is governed by temperature control amplifier 30.

Switch 20 in the "cyclic" mode changes the feedback to amplifier 60 from a signal proportional to temperature to a signal on line 115 proportional to turbine speed. Switch 30 changes the reference input to amplifier 60 from a temperature reference signal on line 70 to a speed reference signal on line 80.

When the fuel is increased by placing switch 10 in its C position, the resulting increase in speed is noted by air flow control amplifier 60 on line 90. Amplifier 60 now compares the speed signal on line 90 with the speed reference signal on line 80. The increasing speed will cause a decrease in the air passed through the inlet guide vanes 9 to bring the power and speed down. This results in increasing exhaust temperature, since, for the same fuel flow, there is now less air flow. Within a very short period of time, the fuel control signal on line 12 will be under control of the temperature control amplifier 30.

As cyclic changes occur in the load, they are reflected by a change in the speed signal on line 115. Air flow control amplifier 60, which is now the main governing amplifier for the output of the gas turbine, will close or open the inlet guide vanes via control 145 in response to increasing or decreasing speed, respectively, to govern the output of the gas turbine by maintaining the speed substantially constant.

Note that the steady state speed is virtually independent of the steady state position of the inlet guide vanes. However, since the fuel flow is simultaneously being modulated to hold constant exhaust temperature, the speed is indirectly controlled by the position of the inlet guide vanes.

As the position of the inlet guide vanes is varied, the exhaust temperature is also altered. The exhaust temperature will now control fuel flow to maintain a constant exhaust temperature set by temperature reference 43. As the load is decreasing, the speed of the turbine increases which causes the inlet guide vanes to close until they are at their maximum closed position (for example, 48 degrees). The output of amplifier 60 is set so that, for example, a zero volt output represents the maximum closed or 48 degree inlet guide vane position. A signal below zero volts from amplifier 60 will deliver a signal through diode 75 to line 120 of amplifier 100 to open the blow off valves via control 105. This causes cycle air to be bypassed from the compressor 2 to the exhaust 8 in proportion to the signal from amplifier 60, which reduces the power of the gas turbine further.

TWO-SHAFT TURBINE CONTROL

Figure 2:
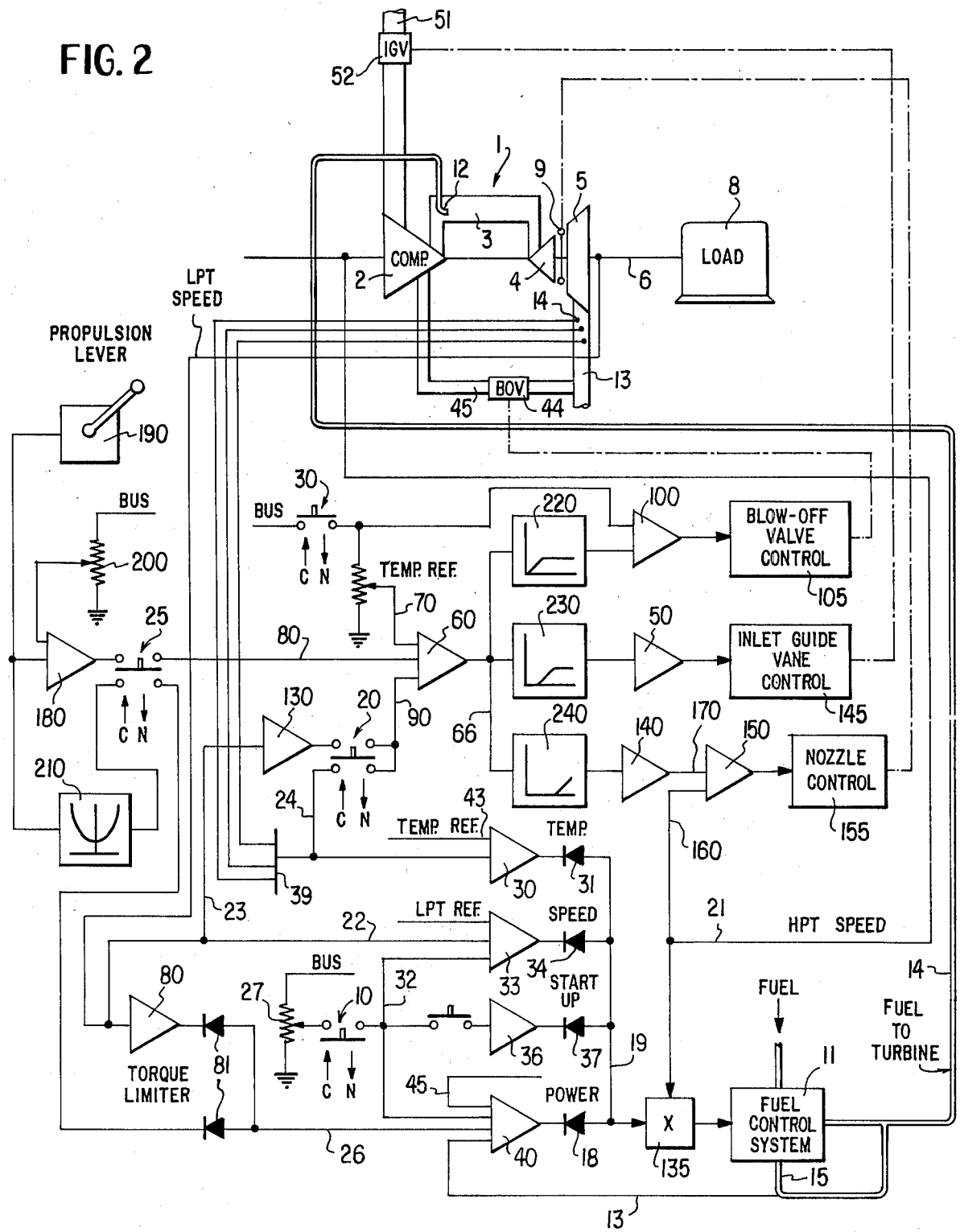
FIG. 2 is a simplified schematic diagram of a control system for a two-shaft gas turbine of the present invention.

Referring now to FIG. 2 of the drawings, there is a simplified representation of a two-shaft gas turbine which is indicated generally by reference numeral 1 and includes a compressor 2, a combustion chamber 3, a high pressure turbine 4 and a low pressure turbine 5. It is known in the art that in certain gas turbine applications, such as for marine vessels, it is desirable to have the high pressure turbine 4 which drives the compressor 2, and the load turbine 5 mounted on separate shafts. The load turbine shaft 6 is connected to a propeller 8.

A variable area second stage nozzle 9 aerodynamically couples the high pressure turbine 4 with the load turbine 5. The details of this nozzle are well known in the art as exemplified by the teaching in U.S. Pat. No. 2,625,789 which is assigned to the assignee of the present invention.

Air entering the compressor inlet 51 passes the inlet guide vanes 52 to the compressor 2 which delivers the compressed air to the combustion chamber 3 for combustion with fuel injected by a nozzle 12. The heated exhaust gases, after passing through the high pressure turbine 4 and low pressure turbine 5, exit from the turbine outlet 13 past distributed temperature sensor 14 for measuring exhaust temperature. Fuel is delivered to nozzle 12 by conduit 14 from fuel system 11 which is under the control of a multiplier 135 that receives a fuel control signal from line 19 and a high pressure turbine speed signal from line 21. The output of multiplier 135 is a signal indicative of the desired fuel flow. The fuel system 11 includes a feedback line 15 for varying the amount of fuel delivered to the combustion chamber.

The two-shaft gas turbine of FIG. 2 includes the same loop control means 30, 33 and 36 as described above in connection with the single-shaft gas turbine. In addition, an additional fuel control signal may be supplied by a power control amplifier 40 whose output diode 18 forms a portion of the low value gate that includes diodes 31, 34 and 37. As fully described in U.S. Pat. Nos. 3,639,076 and 3,729,928, a predetermined minimum power signal is fed into the power control amplifier 40 through line 45. A feedback signal representing the actual fuel flow (that is, proportional to power) is delivered to amplifer 40 via line 13. The reference for the power control amplifier 40 is normally provided via line 26 which compares the signals from a torque limiter amplifier 80 and a power command from a cubic function generator 210 which is responsive to a power set point derived from a propulsion lever 190. The function of power amplifier 40 and torque limiter amplifier 80 are fully described in the above-mentioned patents, and therefore need not be set forth in detail herein.

In addition to mode switches 10, 20 and 30, which perform substantially similarly to the manner set forth above in connection with FIG. 1, a fourth switch 25 is provided which connects the output of the cubic function generator 210 to the input 26 of power amplifier 40 during the "normal" mode, and connects the output of an amplifier 180 to an input 80 of control amplifier 60 during the "cyclic" mode.

The compressor turbine speed signal on line 21 is also fed as an input 160 to a nozzle control amplifier 150 whose output is connected to nozzle control 155. The other input to amplifier 150 is from line 170 which is the output of a limiting amplifier 140 which is limited to insure that the speed set points for the high pressure turbine speed control 150 stays between, for example 92 percent and 100 percent of speed. Amplifier 150 comprises a speed governor for the high pressure turbine whose feedback signal is received along line 160 and whose speed reference signal is received on line 170. The nozzle control 155 provides another means for controlling the cycle air flow through the gas turbine, in addition to the inlet guide vane control 145 and the blow off valve control 105, which operate in response to the output from air flow control amplifier 60 in much the same manner as set forth above with respect to FIG. 1.

In the normal mode of operation, switch 10 has no effect on the governing amplifiers 33 and 40 which operate in their normal manner to control fuel flow to the turbine. Switch 20 provides an exhaust temperature signal along line 24 as input 90 to air flow control amplifier 60 which is compared against the temperature reference signal on line 70 provided when switch 30 is in its "normal" position. Switch 30 also acts to clamp amplifier 100 to maintain the blow off valves closed during the "normal" mode.

In the "normal" mode, switch 25 provides the output signal from the cubic function generator 210 as the primary reference for the fuel control system.

In the "cyclic" mode, switch 10 acts to saturate amplifiers 33 and 40 by means of a voltage signal derived from potentiometer 27 to thereby place the fuel control system under the influence of temperature amplifier 30. Switch 25 delivers a signal to line 80 from the propulsion lever 190 via amplifier 180. The bias on amplifier 180 provided by potentiometer 200 provides a minimum speed signal, and the output of amplifier 180 provides a fixed speed reference on line 80 for air flow control amplifier 60 when in the "cyclic" mode of operation.

The air flow control devices 105, 145 and 155 are cascaded by control networks 220, 230 and 240 in such a manner that, with reducing output demand, the high pressure turbine speed governor 150 acts first to reduce the compressor speed to, for example, 92 percent, then the inlet guide vanes are closed by control 145, and finally at minimum output, the blow off valves are opened by control 105.

During the "normal" mode, the blow off valves are clamped shut and the inlet guide vanes and nozzle controls 145 and 155 operate from an exhaust temperature signal on line 24 which is compared with the set temperature reference on line 70. Amplifier 60 outputs a signal which is proportional to the error between the temperature reference on line 70 and the temperature feedback on line 90. The output of amplifier 140 is a speed reference for the compressor driver amplifier 150 which varies the air flow to hold the exhaust temperature control.

The networks 220, 230 and 240 operate to insure that only one of the controls 105, 135 and 155 are operative at any given point in time. The graphs within the control boxes represent on their horizontal axis the output from amplifier 60 and on their vertical axis the output from the respective networks 220, 230 and 240. It may be appreciated that, during the "cyclic" mode, as the power increases, and assuming a linear output from amplifier 60, control network 220 acts first to open the blow off valves. When the output of amplifier 60 exceeds a predetermined level, the blow off valves stay closed but the inlet guide vanes go from for example, 48 degrees to 88 degrees. As the output from amplifier 60 exceeds the point at which the inlet guide vanes are maintained in their full open position (88 degrees) an input is received by amplifier 140 from control network 240 to vary the nozzle control set point on line 170 from 92 percent speed to 100 percent speed.

Decreasing the power output of the gas turbine will result in a decreasing signal from amplifier 60 which will initially reduce the compressor speed set point from 100 percent to 92 percent, then close the inlet guide vanes from 88 degrees to 48 degrees, and then open the blow off valves from fully closed to fully opened.

Obviously, numerous modifications and variations of the present invention are possible in light of the above teachings. For example, although the above description of operation sets forth the output shaft speed as the primary input reference function to the turbine control, it is clear that the present invention may follow and respond to the power level reference signal as the primary reference function. It is therefore to be understood that within the scope of the appended claims, the invention may be practiced otherwise than as specifically described herein.

What is claimed is:

1. A control system for a gas turbine having a combustion chamber, which comprises:
   a plurality of loop control means for generating a fuel control signal for controlling the fuel flow to said combustion chamber in response to different operating parameters of said gas turbine,
   means for generating an air control signal for controlling air flow to said combustion chamber in response to different operating parameters of said gas turbine,
   said means for generating a fuel control signal being responsive, in a first mode of operation, to the detected speed and temperature of said gas turbine to vary the fuel flow accordingly, and said means for generating an air control signal being responsive, in said first mode of operation, to said temperature of said gas turbine to vary the air flow to maintain said temperature substantially constant, and
   said means for generating a fuel control signal also being responsive, in a second mode of operation, to said temperature of said gas turbine to maintain said temperature substantially constant, and said means for generating an air control signal also being responsive, in said second mode of operation, to said detected speed of said gas turbine to vary the air flow to maintain said speed substantially constant.

2. A control system as set forth in claim 1, further comprising inlet guide vane means responsive to said means for generating an air control signal for controlling the inlet air to said combustion chamber within predefined upper and lower limits of air flow.

3. A control system as set forth in claim 2, further comprising blow off valve means also responsive to said means for generating an air control signal for bypassing cycle air when the air flow through said inlet guide vane means drops to its limit of flow.

4. In a gas turbine control system having means for controlling fuel flow to a combustion chamber of the gas turbine in accordance with a lowest value gated fuel control signal developed by a pluarlity of loop control means, each responsive to a different operating parameter of the gas turbine and each arranged to supply a respective fuel control signal to a low value gating means, the improvement comprising:
   means for controlling air flow to said combustion chamber in accordance with an air flow control signal which, in a first mode of operation, is developed in response to detected temperature conditions to maintain the temperature of said gas turbine substantially constant and which, in a second mode of operation is developed in response to the detected speed of said gas turbine to maintain the speed of said gas turbine substantially constant.

5. The improved gas turbine control system of claim 4, wherein said means for controlling fuel flow to said combustion chamber is responsive, in said second mode of operation, to detected temperature conditions to maintain said temperature substantially constant while said air flow is varied in response to said air flow control signal.

* * * * *